(12) United States Patent
Makino

(10) Patent No.: US 7,679,696 B2
(45) Date of Patent: Mar. 16, 2010

(54) LIQUID CRYSTAL DISPLAY DEVICE

(75) Inventor: Katsuhiko Makino, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 239 days.

(21) Appl. No.: 12/068,315

(22) Filed: Feb. 5, 2008

(65) Prior Publication Data

US 2008/0192169 A1 Aug. 14, 2008

(30) Foreign Application Priority Data

Feb. 8, 2007 (JP) .............................. 2007-029491

(51) Int. Cl.
*G02F 1/13331* (2006.01)
(52) U.S. Cl. ........................................ 349/58; 349/155
(58) Field of Classification Search .................... 349/58, 349/59, 60, 150, 155
See application file for complete search history.

(56) References Cited

U.S. PATENT DOCUMENTS

2006/0197887 A1\* 9/2006 Sakuma ....................... 349/58
2006/0244891 A1\* 11/2006 Tsubokura et al. .......... 349/150
2008/0106667 A1\* 5/2008 Fukuda ......................... 349/58
2008/0192169 A1\* 8/2008 Makino ......................... 349/58
2009/0009680 A1\* 1/2009 Zensai ........................... 349/58
2009/0079902 A1\* 3/2009 Ogura .......................... 349/58

FOREIGN PATENT DOCUMENTS

| DE | 20 2006 000 189 U1 | 5/2006 |
|---|---|---|
| JP | 2003-167231 | 6/2003 |
| JP | 3108915 U | 4/2005 |
| JP | 2006-133650 | 5/2006 |
| JP | 2006-227057 | 8/2006 |

\* cited by examiner

*Primary Examiner*—Akm E Ullah
(74) *Attorney, Agent, or Firm*—Morgan Lewis & Bockius LLP

(57) ABSTRACT

A liquid crystal display device has support leg parts formed in one piece with a rear frame, and a support base part that has a base part formed in one piece with the support leg parts for supporting a printed wiring board. The rear frame and the support leg part are connected to each other through a first curved surface part, and the support leg part and the base part are connected to each other through a second curved surface part. The first curved surface part has a curvature radius greater than that of the second curved surface part, and the support leg part is formed perpendicular to the rear frame.

13 Claims, 6 Drawing Sheets

LIQUID CRYSTAL DISPLAY DEVICE

CROSS-REFERENCE TO RELATED APPLICATIONS

This application is based on Japanese Patent Application No. 2007-029491 filed on Feb. 8, 2007, the contents of which are hereby incorporated by reference.

BACKGROUND OF THE INVENTION

1. Field of the Invention

The present invention relates to a liquid crystal display device that can reliably mount a printed circuit board.

2. Description of Related Art

A liquid crystal display device is a thin, lightweight device with low power consumption, which is widely used for a notebook PC, a PC monitor, a home television set, and the other appliances. In the liquid crystal display device, lights emitted from a back light transmit a liquid crystal panel to form video.

The liquid crystal display device has a plurality of printed wiring boards arranged thereon, and the individual printed wiring boards have electronic components mounted thereon. The liquid crystal display device is formed in such a way that printed wiring boards are arranged on the back surface of a rear frame formed of a bent metal plate, and on the back surface of the rear frame, a plurality of support base parts is formed so as to elevate by extruding. The printed wiring boards are bolted to a plurality of support base parts.

FIG. 10 shows a perspective view seen from the back surface side of a conventional liquid crystal display device, and FIG. 11 shows a side view depicting a support base part of a rear frame of the conventional liquid crystal display device. As shown in FIG. 10, the liquid crystal display device before has a support base part 93 that projects from the under surface of a bottom part 11 of a rear frame 1, and a printed wiring board 61 is fixed with a bolt Bt through the support base part 93 (see FIG. 11). As shown in FIG. 11, the support base part 93 has a pair of support leg parts 931 that stand from the back surface of the bottom part 11, a rectangular base part 932 to both ends part of which a pair of the support leg parts 931 is joined, and an internal thread hole 933 that is formed in the base part 932.

In the support base part 93, the support leg parts 931 obliquely stand so as to come close to each other from the bottom part 11. The rear frame 1 is formed in one piece with the support leg part 931, and the support leg part 931 is formed in one piece with the base part 932. A connecting part 934 of the rear frame 1 to the support leg part 931 and a connecting part 935 of the support leg part 931 to the base part 932 are formed of curved surfaces having a small curvature radius.

As shown in FIG. 11, when the printed wiring board 61 is arranged on the support base part 93, the support leg parts 931 are arranged closely to the mounting part of the printed wiring board 61 on the support base part 93. Near the mounting part on the support base part 93, a prohibiting area Pf is formed on which no electronic components are mounted in order to prevent the terminals of the electronic components from being contacted with the support leg parts 931. The wiring pattern of the printed wiring board 61 is designed such a way that no electronic components are mounted on the prohibiting area Pf.

In addition, such a scheme is proposed that a truncated conic support base part is used to fix a printed wiring board (see Japanese utility Model Registration No. 3108915, JP-A-2003-167231, and JP-A-2006-227057). Also in this case of the truncated conic support base part, a prohibiting area is similarly formed near the mounting part of the truncated conic support base part and the wiring pattern of the printed wiring board is formed so as not to mount electronic components on the prohibiting area.

When a printed wiring board is upsized, the printed wiring board is sometimes warped or bent due to its weight. In order to suppress this warpage or bend, it is necessary to increase a support part supported by a support base part, which correspondingly expands a prohibiting area. On this account, the wiring pattern has to be laid out except the prohibiting area, and the sizes of the wiring pattern itself and the printed wiring board itself are increased.

When the sizes of the layout of the wiring pattern and the printed wiring board are increased, a large number of materials are necessary to form the wiring pattern and the printed wiring board. When the size of the wiring pattern is reduced as the prohibiting area is left, the printed wiring board itself is downsized but the flexibility of the layout of the wiring pattern is dropped, or the layout has a smaller margin, which might cause operational defects due to noise or short circuits.

SUMMARY OF THE INVENTION

An object of the invention is to provide a liquid crystal display device that can downsize of a printed wiring board.

In addition, an object of the invention is to provide a liquid crystal display device that can lay out the wiring pattern of a printed wiring board effortlessly without upsizing the printed wiring board.

Moreover, an object of the invention is to provide a liquid crystal display device in which a rear frame can be formed by using a thin metal plate and weight reduction and resource savings can be achieved.

A liquid crystal display device according to an embodiment of the invention is a liquid crystal display device, characterized by including: a rear frame formed by bending a metal plate and having a rectangular bottom part; a printed circuit board that is screwed and fixed to the back surface side of the bottom part of the rear frame; and a support base part that is formed one piece on the back surface side of the bottom part at a position corresponding to a through hole for screwing formed in the printed circuit board, the support base part for screwing the printed circuit board, wherein the support base part has a rectangular base part formed in parallel with the bottom part, an internal thread hole formed in the center of the base part, and two support leg parts joined in one piece with each other through sides facing each other of the base part and curved surfaces, wherein the two support leg parts are joined one piece with each other through the bottom part and curved surfaces, and at least one support leg part is formed perpendicular to the bottom part and to the base part, and a curvature radius of the curved surface formed between the base part and the support leg part formed perpendicular to the bottom part and to the base part is smaller than a curvature radius of the curved surface formed between the bottom part and the support leg part.

According to this configuration, the support base part can be provided with a sufficient strength as well as an area can be reduced in which the printed circuit board and the support base part (the support leg part) are overlapped with each other. Thus, a prohibiting area can be reduced that is provided so that the terminals of electronic components to be mounted on the printed circuit board do not interfere, which can correspondingly improve the flexibility of the wiring pattern layout of the printed circuit board.

In addition, since the prohibiting area can be reduced, the number of the support base parts can be increased. Moreover, the curvature radius of the curved surface formed between the bottom part and the support leg part is increased, whereby the amount of being pulled when machining can be decreased. Accordingly, the rear frame can be formed with a metal plate thinner than a conventional metal plate, which contributes to weight reduction and resource savings of members.

In a preferable embodiment of the invention, the support base part may be formed on an inner side than an edge part of the bottom part, and formed as facing an edge part of the bottom part.

In a preferable embodiment of the invention, both of the two support leg parts are formed perpendicular to the bottom part and to the base part.

In a preferable embodiment of the invention, the support base part has a positioning part in which a part of one support leg part is bent on the base part side, wherein a tip end of the positioning part is formed so as to be projected from the base part.

A liquid crystal display device according to another embodiment of the invention is a liquid crystal display device, characterized by including: a rear frame formed by bending a metal plate and having a rectangular bottom part; a liquid crystal panel mounted on a top surface side of the rear frame; a printed circuit board that is screwed and fixed to the back surface side of the bottom part of the rear frame; and support base parts that are formed one piece on the back surface side of the bottom part at a position corresponding to a through hole for screwing formed in the printed circuit board, the support base part for screwing the printed circuit board, wherein the support base part has a rectangular base part formed in parallel with the bottom part, an internal thread hole formed in the center of the base part, and a pair of support leg parts joined in one piece with sides facing each other of the base part and curved surfaces and arranged perpendicular to the base part and to the bottom part, wherein the pair of the support leg parts are joined in one piece through the bottom part and the curved surfaces, individual curved surfaces formed between the base part and the pair of the support leg parts have a same curvature radius, individual curved surfaces formed between the bottom part and the pair of the support leg parts have a same curvature radius, and a curvature radius of the individual curved surfaces formed between the base part and the pair of the support leg parts is formed smaller than a curvature radius of the individual curved surfaces formed between the bottom part and the pair of the support leg parts.

DESCRIPTION OF THE PREFERRED EMBODIMENTS

Figure 1:
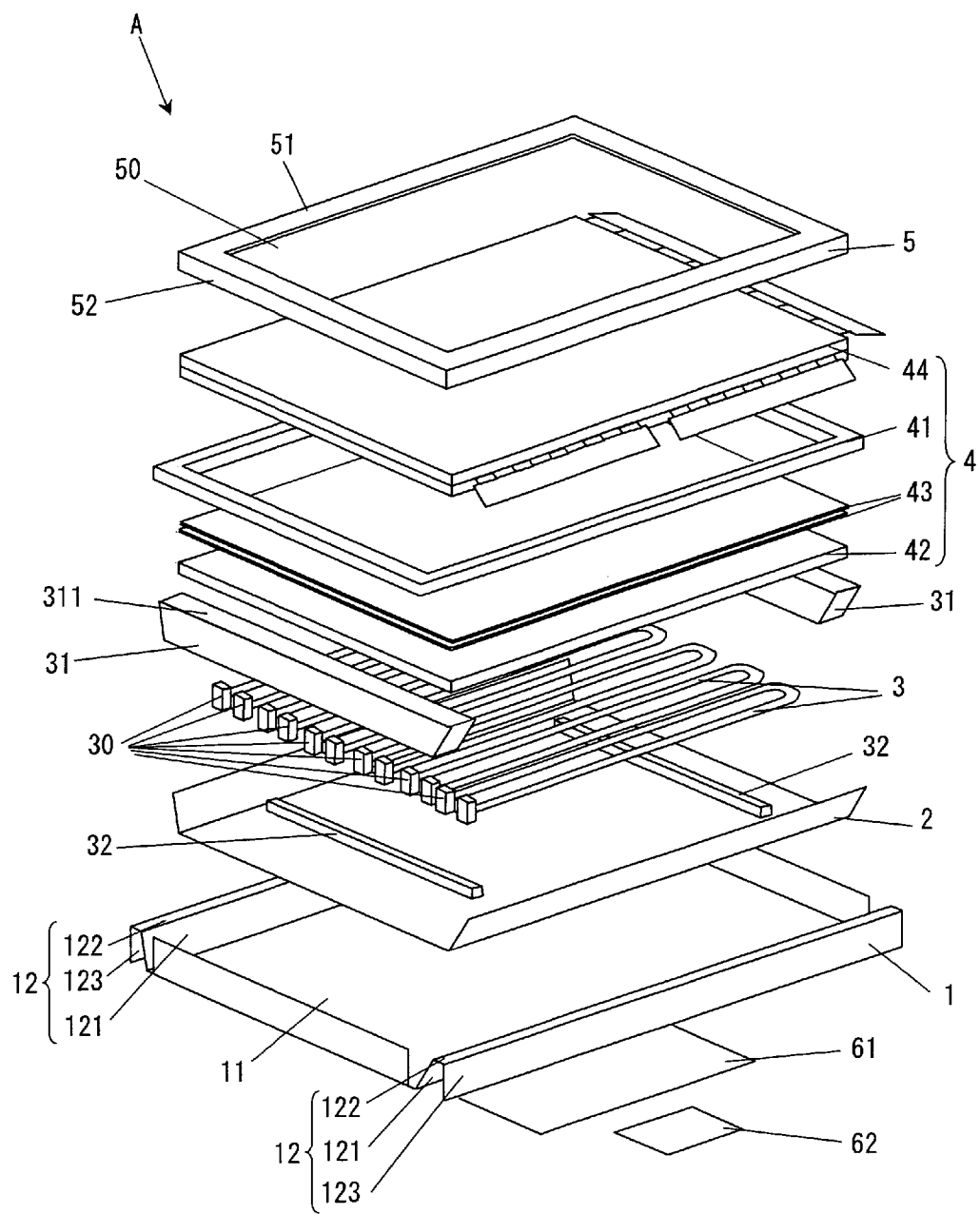
FIG. 1 shows an exploded perspective view depicting a liquid crystal display device according to the invention.

Hereinafter, an embodiment of the invention will be described with reference to the drawings. FIG. 1 shows an exploded perspective view depicting a liquid crystal display device according to the invention. As shown in FIG. 1, the liquid crystal display device A at least has a rear frame 1, a reflective sheet 2, a back light 3, light frames 31, a liquid crystal panel 4, a bezel 5, a main board 61, and a timing controller board 62.

The rear frame 1 is a frame that is formed by bending a metal plate, having a rectangular bottom part 11 and standing parts 12 that stand on a pair of long sides of the bottom part 11. The standing part 12 has a connecting part 121 that stands from the bottom part 11, a support part 122 that is joined to the connecting part 121 and supports the long side of the liquid crystal panel 4, and an outer frame part 123 that is joined to the support part 122 and faces the connecting part 121. In addition, on the back surface side of the rear frame 1, a support base part 13, described later, is formed that screws a main board 61, a timing controller board 62 and the other boards.

The reflective sheet 2 is arranged on the front surface side of the rear frame 1, which is closely contacted with the bottom part 11 and the connecting part 121 of the rear frame 1. After the reflective sheet 2 is arranged on the front surface side of the rear frame 1, the back light 3 is arranged thereon. The back light 3 is a U-shaped cathode-ray tube, on both ends of which a lamp holder 30 is mounted. To the lamp holder 30, a cable, not shown, is connected, and through the cable, electric power is supplied to drive the back light 3. In addition, light support members 32 are also provided that penetrate through the reflective sheet 2, and are fixed to the rear frame 1 for supporting the back light 3.

On the short sides of the rear frame 1, a light frame 31 is provided that is mounted on the front surface side to support the lamp holder 30 and the folded parts of the back light 3. The light frame 31 is formed in a trapezoid, which is arranged so as to contact with the bottom part 11 and the connecting part 121 of the rear frame 1. In addition, the light frame 31 has a support part 311 that is arranged on the same plane as the support part 122 of the rear frame 1 as the support part 311 is arranged on the short side of the rear frame 1.

The liquid crystal panel 4 has a cell guide 41, a diffuser 42 and diffusing sheets 43 that diffuse the light emitted from the back light 3 and the light reflected in the reflective sheet 2, and a liquid crystal cell 44 that has a pair of glass substrates between which liquid crystals are filled. The outer part of the diffuser 42 is supported by the support part 122 of the rear frame 1 and the support part 311 of the light frame 31, and on the top thereof, two diffusing sheets 43 are arranged.

The cell guide 41 is a rectangular frame body that retains four sides of the diffuser 42 and the diffusing sheets 43 from the front surface side toward the support part 122 of the rear frame 1 and the support part 311 of the light frame 31. On the cell guide 41, the liquid crystal cell 44 is placed, and four sides of the liquid crystal cell 44 are held by the cell guide 41. On the glass substrates of the liquid crystal cell 44, a transparent electrode is formed in every pixel so as to face each other, in which a predetermined voltage is applied between the transparent electrodes facing each other, or the light from the diffusing sheets 43 is transmitted or blocked, whereby an image is formed on the liquid crystal panel 4.

The bezel 5 is a metal frame body that can cover the rear frame 1 and the light frame 31, having an opening 50 through which a user can visually see the video display part of the liquid crystal panel 4 from outside. In addition, the bezel 5 has an L-shape cross section, including a front surface part 51 that abuts against the support part 122 of the rear frame 1 and the support part 311 of the light frame 31, and a side surface part 52 that abuts against the outer frame part 123 of the rear frame 1. The bezel 5 is bolted to the rear frame 1 and the light frame 31. The bolt that fixes the bezel 5 penetrates through the cell guide 41. The bezel 5 is firmly fixed to the rear frame 1 and the light frame 31, whereby the cell guide 41 is clamped between the rear frame 1, the light frame 31 and the bezel 5 for stable fixing. The bezel 5 is grounded.

The main board 61 is a board in which a plurality of electronic components is mounted on a rectangular printed circuit board for operations of power supply for driving the individual parts of the liquid crystal display device A and controlling input and output signals. The main board 61 is bolted together to the support base part 13, described later, and then fixed to the back surface of the rear frame 1.

The timing controller board 62 is a rectangular printed circuit board, on which a timing controller is mounted that sends a timing pulse. In addition, other than the timing controller, a plurality of electronic components is mounted. The timing controller board 62 is bolted together to the support base part 13, and then fixed to the back surface of the rear frame 1. The timing controller board 62 is connected to the main substrate 61 through a signal cable such as a FPC.

Figure 2:
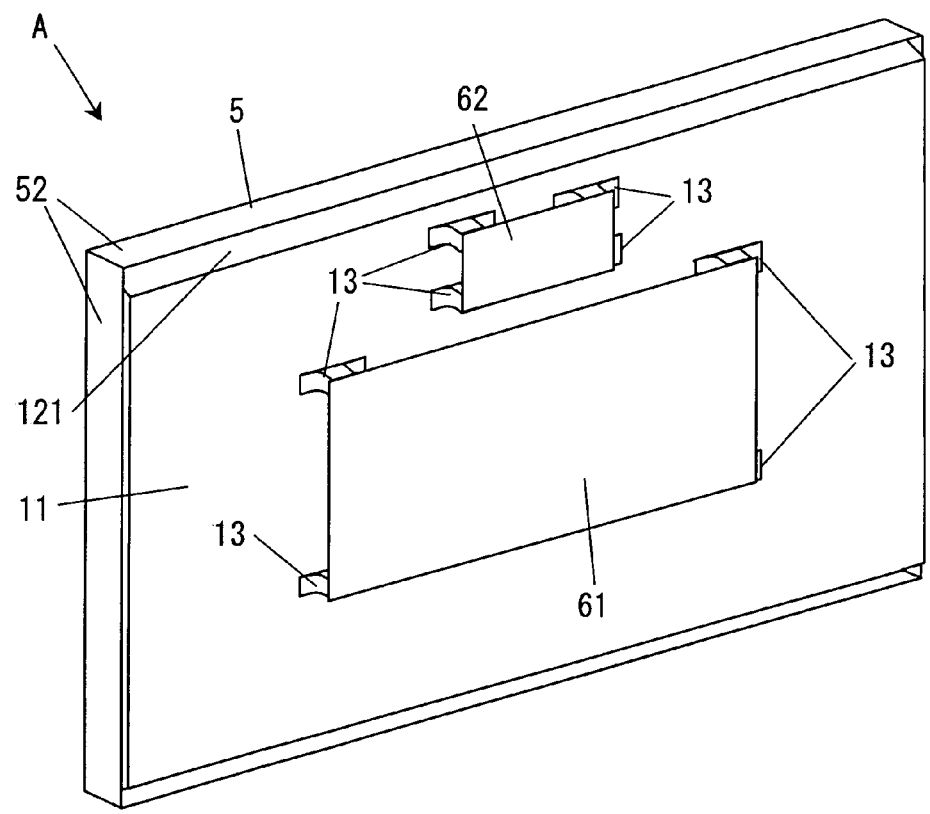
FIG. 2 shows a perspective view seen from the back surface side of the liquid crystal display device shown in FIG. 1.
Figure 3:
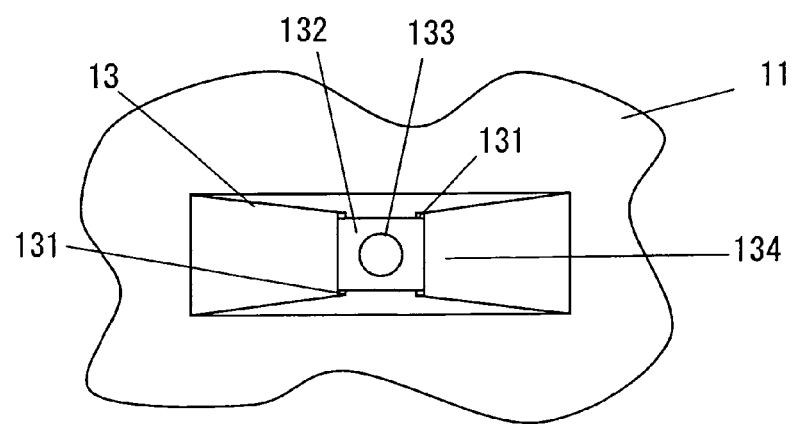
FIG. 3 shows a plan view depicting a support base part formed on a rear frame shown in FIG. 2.
Figure 4:
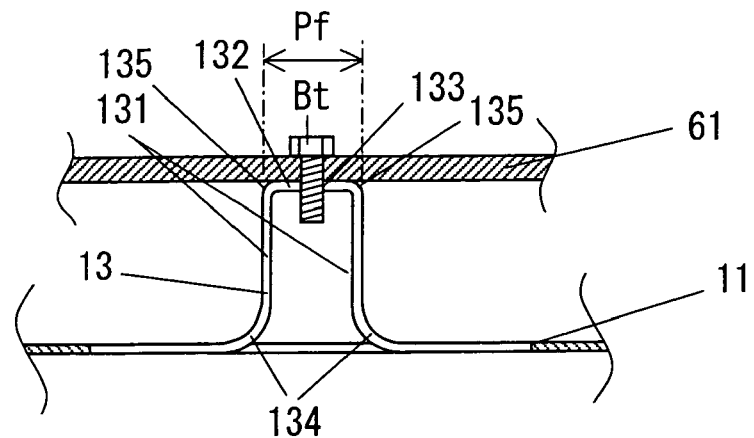
FIG. 4 shows a front view depicting the support base part shown in FIG. 3.

FIG. 2 shows a perspective view seen from the back surface side of the liquid crystal display device shown in FIG. 1. FIG. 3 shows a plan view depicting the support base part formed on the rear frame shown in FIG. 2. FIG. 4 shows a front view depicting the support base part shown in FIG. 3. FIG. 4 shows the support base part that supports one place of the main board 61, but which is not restricted thereto. As shown in FIG. 2, the support base part 13 is projected from the back surface of the rear frame 1. The support base part 13 is a member that stably supports the main board 61 and the timing controller board 62. Here, a plurality of the support base parts 13 (eight in total) is formed at four corners of the main board 61 and four corners of the timing controller board 62, but which is not restricted thereto.

As shown in FIGS. 3 and 4, the support base part 13 has support leg parts 131 that stand from the bottom part 11 of the rear frame 1, a rectangular base part 132 that is formed in parallel with the bottom part 11 of the rear frame 1, and an internal thread hole 133 that is formed in the center of the base part 132. As shown in FIG. 4, after a printed wiring board (the main substrate 61, here) is arranged on the base part 132, they are bolted together with a bolt Bt, and then the main substrate 61 is fixed to the back surface of the bottom part 11 of the rear frame 1.

The rear frame 1 and the support leg part 131 are formed in one piece, and the support leg part 131 and the base part 132 are also formed in one piece. The rear frame 1 and the support leg part 131 are connected to each other through a first curved surface part 134, and the support leg part 131 and the base part 132 are connected to each other through a second curved surface part 135. As shown in FIG. 4, the support leg part 131 is formed perpendicular to the bottom part 11 of the rear frame 1 as well as perpendicular to the base part 132. The base part 132 is formed perpendicular to the support leg part 131, and thus the main board 61 and the support leg part 131 are not vertically overlapped with each other when the main board 61 is arranged on the support base part 13 (see FIG. 4). Therefore, a prohibiting area Pf of the main board 61 has only an area in which the main board 61 is contacted with the base part 132 and the main board 61 is overlapped with the second curved surface parts 135, and then the prohibiting area Pf can be reduced correspondingly.

The area of the prohibiting area Pf of the main board 61 is reduced, whereby the flexibility of the layout of the wiring pattern formed on the main board 61 can be increased. On this account, the wiring pattern and (or) the main board 61 can be downsized, and the materials necessary for fabrication can be reduced. In addition, since the flexibility of the layout of the wiring pattern can be increased, it is unlikely to form a difficult wiring pattern, which can correspondingly suppress the occurrence of problems such as noise, electrical leak, and malfunctions caused by the wiring pattern.

Figure 5:
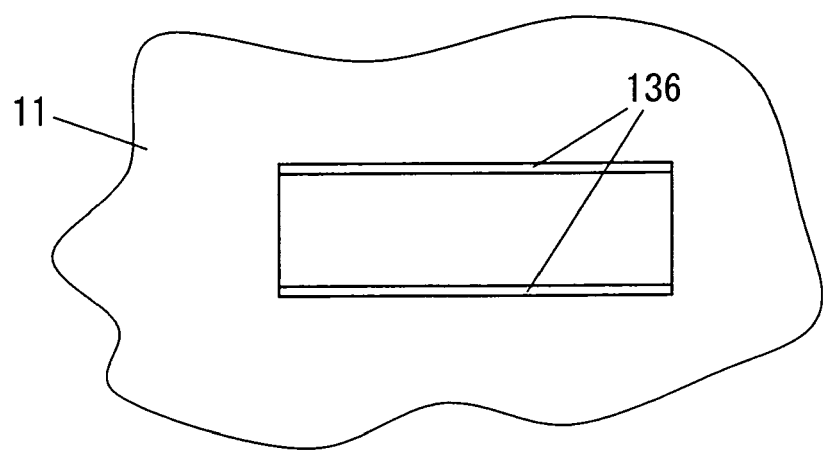
FIG. 5 shows a schematic diagram depicting a first step of the fabrication process steps of the support base part.
Figure 6:
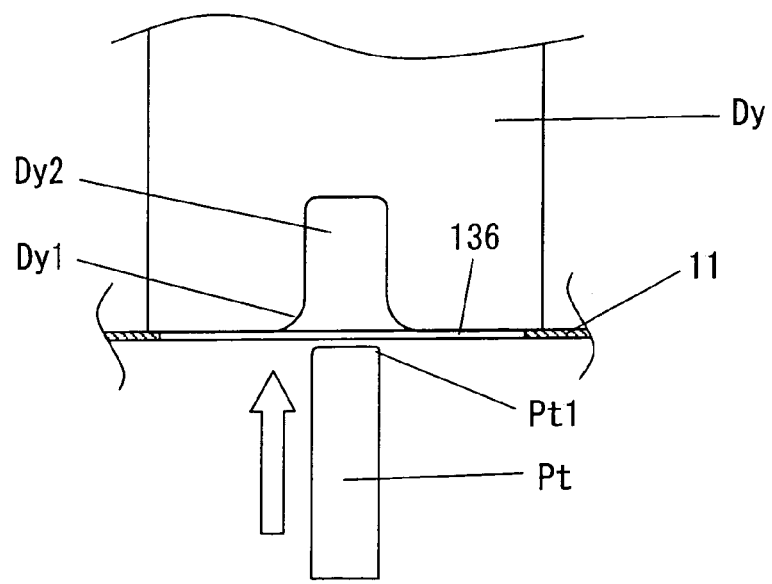
FIG. 6 shows a schematic diagram depicting a second step of the fabrication process steps of the support base part.
Figure 7:
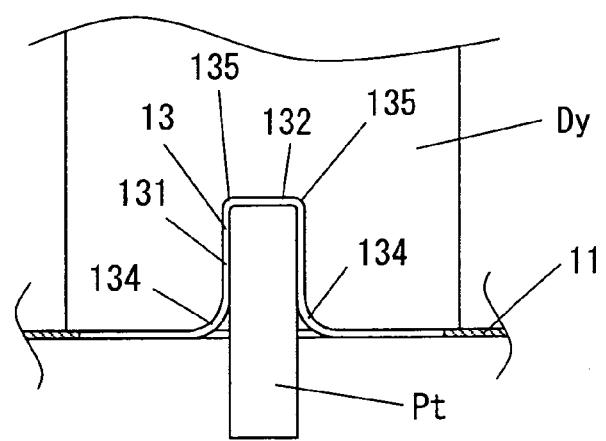
FIG. 7 shows a schematic diagram depicting a third step of the fabrication process steps of the support base part.

The support base part 13 is formed by drawing. FIGS. 5 to 7 show a schematic diagram depicting the first step to the third step of the fabrication process steps of the support base part. First, as shown in FIG. 5, two notches 136 having the same length are formed in parallel with each other in the bottom part 11 of the rear frame 1. As shown in FIG. 6, a die Dy having a hollow Dy2 is arranged on the back surface side of the bottom part 11 of the rear frame 1, and a punch Pt is arranged on the front surface side of the bottom part 11 of the rear frame 1 which is fit into the die Dy. At this time, the punch Pt is arranged between a pair of the notches 136 in the center part in the longitudinal direction. As shown in FIG. 6, the punch Pt is gradually pushed into the die Dy.

At this time, the bottom part 11 of the rear frame 1 is pressed by the punch Pt and pushed into the space between the punch Pt and the die Dy, and then the support base part 13 is formed as shown in FIG. 7. In drawing, the curvature radius of the first curved surface part 134 is determined by the curved surface topology of a port Dy1 of the die Dy, and the curvature radius of the second curved surface part 135 is determined by the curved surface topology of a tip end Pt1 of the punch Pt. The second curved surface part 135 is a factor that forms the prohibiting area Pf, and preferably, the curvature radius thereof is that as small as possible.

In drawing of the support base part 13, the support leg part 131 and the base part 132 are extended (plastically deformed) by drawing, which makes a thinner plate thickness correspondingly. Since the second curved surface part 135 formed between the support leg part 131 and the base part 132 is pulled by the support leg part 131 and the base part 132, the second curved surface part 135 becomes locally, rapidly thinned and tends to break. Then, the curvature radius of the first curved surface part 134 is increased to reduce the pulling amount of the support leg part 131 by the first curved surface part 134 in drawing as well as to reduce the amount of pulling the second curved surface part 135 by the support leg part 131, which can correspondingly suppress an event that the second curved surface part 135 becomes locally, rapidly thinned.

As described above, the curvature radius of the first curved surface part 134 is formed so as to exceed the curvature radius of the second curved surface part 135, whereby even though such a metal plate is used that is thinner than a metal plate used for a conventional rear frame, the support leg part 131 can be formed perpendicular to the bottom part 11, and the strength of the support base part 13 can be obtained that is enough to support the main boards 61 and the timing controller 62 as well as the prohibiting area Pf can be reduced as small as possible. Thus, the layout of the wiring patterns of the main boards 61 and the timing controller 62 can be made effective. Therefore, the weight of the rear frame 1 can be reduced, and the materials for fabricating the rear frame 1 and the printed wiring boards 61 and 62 can be decreased, which can contribute to resource savings and low costs.

Figure 8:
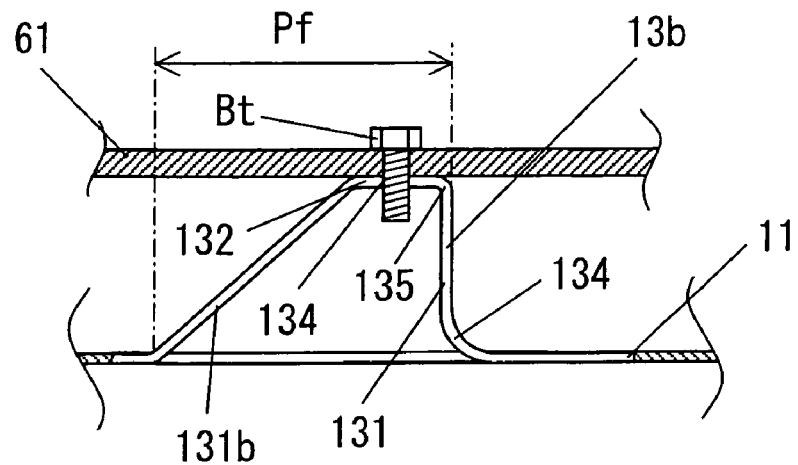
FIG. 8 shows a side view depicting another example of a support base part formed in the liquid crystal display device according to the invention.

FIG. 8 shows a side view depicting another example of a support base part formed in the liquid crystal display device according to the invention. In a support base part 13b shown in FIG. 8, a second support leg part 131b that is one of support leg parts is formed obliquely as the conventional liquid crystal display device. The portions other than this have the same form as the support base part 13 shown in FIG. 4, and basically the same portions are designated the same numerals and signs.

As shown in FIG. 8, a support leg part 131 and the second support leg part 131b stand from a bottom part 11 of a rear frame 1. The support leg part 131 is joined to the bottom part 11 of the rear frame 1 through a first curved surface part 134, and joined to a base part 132 through a second curved surface part 135. The support leg part 131 stands perpendicular to the bottom part 11 of the rear frame 1.

The second support leg part 131b is erected obliquely to the bottom part 11 of the rear frame 1. A prohibiting area Pf is formed in an area in which a printed wiring board (a main board 61, here) is vertically overlapped with the section from the second support leg part 131b to the second curved surface part 135. As described above, the second support leg part 131b is obliquely drawn, whereby the amount pulled by the second support leg part 131b in drawing can be reduced, which can correspondingly suppress the occurrence of problems that the second curved surface part 135 and the curved surface part joining the second support leg part 131b to the base part 132 become very thin to break.

Figure 9:
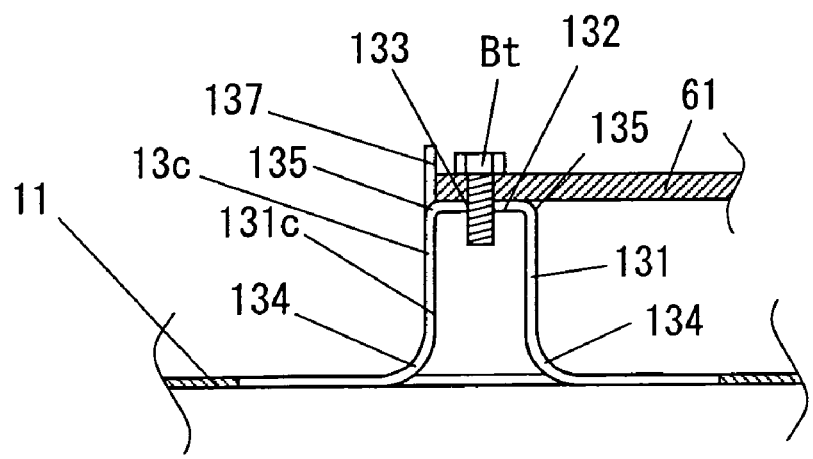
FIG. 9 shows a side view depicting still another example of a support base part formed in the liquid crystal display device according to the invention.
Figure 10:
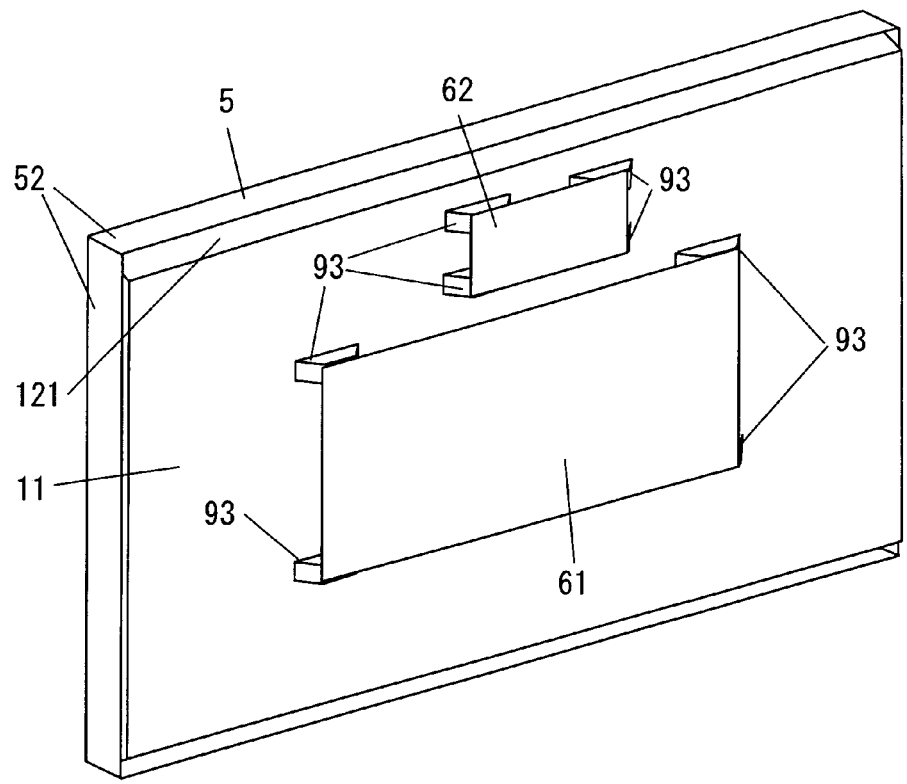
FIG. 10 shows a perspective view seen from the back surface side of a conventional liquid crystal display device.
Figure 11:
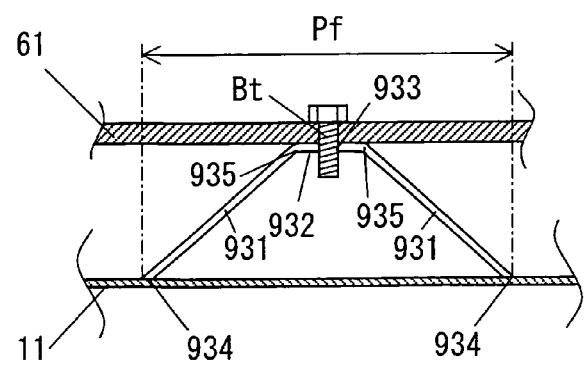
FIG. 11 shows a side view depicting a support base part of the rear frame of the conventional liquid crystal display device.

FIG. 9 shows a side view depicting still another example of a support base part formed in the liquid crystal display device according to the invention. In a support base part 13c shown in FIG. 9, other than that the form of a support leg part 131c is different, the portions other than this have the same form as the support base part 13 shown in FIG. 4, and basically the same portions are designated the same numerals and signs.

The support leg part 131c of the support base part 13c shown in FIG. 9 is formed with a stopper part 137 that stands on the base part 132 by cutting and erecting one of the support leg parts 131c. The stopper part 137 is used for positioning when a main substrate 61 is arranged on the support base part 13c by penetrating the stopper part 137 through a through hole formed on the end part of a printed wiring board (a main board 61 here) or a main board 61. The stopper part 137 is formed, whereby when the main board 61 is arranged on the back surface side of a bottom part 11 of a rear frame 1, the main board 61 can be readily, instantaneously arranged at an accurate position. Thus, a time period taking for assembly can be shortened.

The invention can be adapted to a liquid crystal display device in which a printed circuit board is mounted on the back surface.

What is claimed is:

1. A liquid crystal display device, comprising:
    a rear frame formed by bending a metal plate and having a rectangular bottom part;
    a printed circuit board that is screwed and fixed to the under surface side of the bottom part of the rear frame; and
    a support base part that is formed one piece with the rear frame on the back surface side of the bottom part at a position corresponding to a through hole for screwing formed in the printed circuit board, the support base part for screwing the printed circuit board, characterized in that
    the support base part has a rectangular base part formed in parallel with the bottom part, an internal thread hole formed in the center of the base part, and two support leg parts joined in one piece with each other through sides facing each other of the base part and curved surfaces,
    the two support leg parts are joined one piece with each other through the bottom part and curved surfaces, and
    at least one support leg part is formed perpendicular to the bottom part and to the base part, and
    a curvature radius of the curved surface formed between the base part and the support leg part formed perpendicular to the bottom part and to the base part is smaller than a curvature radius of the curved surface formed between the bottom part and the support leg part.

2. The liquid crystal display device according to claim 1, characterized in that the support base part is formed on an inner side than an edge part of the bottom part.

3. The liquid crystal display device according to claim 1, characterized in that a part of the support base part is formed as facing an edge part of the bottom part.

4. The liquid crystal display device according to claim 1, characterized in that both of the two support leg parts are formed perpendicular to the bottom part and to the base part.

5. The liquid crystal display device according to claim 2, characterized in that both of the two support leg parts are formed perpendicular to the bottom part and to the base part.

6. The liquid crystal display device according to claim 3, characterized in that both of the two support leg parts are formed perpendicular to the bottom part and to the base part.

7. The liquid crystal display device according to claim 1, characterized in that the support base part has a positioning part in which a part of one support leg part is bent on the base part side,
    wherein a tip end of the positioning part is formed so as to be projected from the base part.

8. The liquid crystal display device according to claim 2, characterized in that the support base part has a positioning part in which a part of one support leg part is bent on the base part side, and
    a tip end of the positioning part is formed so as to be projected from the base part.

9. The liquid crystal display device according to claim 3, characterized in that the support base part has a positioning part in which a part of one support leg part is bent on the base part side, and
    a tip end of the positioning part is formed so as to be projected from the base part.

10. The liquid crystal display device according to claim 4, characterized in that the support base part has a positioning part in which a part of one support leg part is bent on the base part side, and
    a tip end of the positioning part is formed so as to be projected from the base part.

11. The liquid crystal display device according to claim 5, characterized in that the support base part has a positioning part in which a part of one support leg part is bent on the base part side, and
    a tip end of the positioning part is formed so as to be projected from the base part.

12. The liquid crystal display device according to claim 6, characterized in that the support base part has a positioning part in which a part of one support leg part is bent on the base part side, and a tip end of the positioning part is formed so as to be projected from the base part.

13. A liquid crystal display device, comprising:

a rear frame formed by bending a metal plate and having a rectangular bottom part;

a liquid crystal panel mounted on a top surface side of the rear frame;

a printed circuit board that is screwed and fixed to the back surface side of the bottom part of the rear frame; and a support base part that is formed one piece on the back surface side of the bottom part at a position corresponding to a through hole for screwing formed in the printed circuit board, the support base part for screwing the printed circuit board, characterized in that the support base part has a rectangular base part formed in parallel with the bottom part, an internal thread hole formed in the center of the base part, and a pair of support leg parts joined in one piece with sides facing each other of the base part and curved surfaces and arranged perpendicular to the base part and to the bottom part, the pair of the support leg parts are joined in one piece through the bottom part and curved surfaces, individual curved surfaces formed between the base part and the pair of the support leg parts have a same curvature radius, the individual curved surfaces formed between the bottom part and the pair of the support leg parts have a same curvature radius, and a curvature radius of the individual curved surfaces formed between the base part and the pair of the support leg parts is formed smaller than a curvature radius of the individual curved surfaces formed between the bottom part and the pair of the support leg parts.

* * * * *